US011574216B2

(12) United States Patent
Tung et al.

(10) Patent No.: US 11,574,216 B2
(45) Date of Patent: Feb. 7, 2023

(54) COORDINATED MULTIPLE WORKER NODE CAUSAL INFERENCE FRAMEWORK

(71) Applicant: Accenture Global Solutions Limited, Dublin (IE)

(72) Inventors: Teresa Sheausan Tung, Tustin, CA (US); Mohamad Mehdi Nasr-Azadani, Menlo Park, CA (US); Yao A. Yang, Sunnyvale, CA (US); Zaid Tashman, San Francisco, CA (US); Maziyar Baran Pouyan, Emeryville, CA (US)

(73) Assignee: ACCENTURE GLOBAL SOLUTIONS LIMITED, Dublin (IE)

( * ) Notice: Subject to any disclaimer, the term of this patent is extended or adjusted under 35 U.S.C. 154(b) by 377 days.

(21) Appl. No.: 16/906,759

(22) Filed: Jun. 19, 2020

(65) Prior Publication Data

US 2020/0401915 A1    Dec. 24, 2020

Related U.S. Application Data

(60) Provisional application No. 62/865,022, filed on Jun. 21, 2019.

(51) Int. Cl.
*G06F 15/16* (2006.01)
*G06N 5/04* (2006.01)
*G06N 20/00* (2019.01)

(52) U.S. Cl.
CPC .............. *G06N 5/04* (2013.01); *G06N 20/00* (2019.01)

(58) Field of Classification Search
CPC .................. G06N 5/04; G06N 20/00
(Continued)

(56) References Cited

U.S. PATENT DOCUMENTS 9,614,651 B1*   4/2017   Vivanco ................. H04L 5/0032
2015/0193693 A1*  7/2015   Vasseur .................. G06N 20/00
                                                                    706/12
(Continued)

FOREIGN PATENT DOCUMENTS

CN          103745225 A      4/2014
WO      WO 2019/042571 A1    3/2019

OTHER PUBLICATIONS

Zhu, Yue et al., "Entropy-Aware I/O Pipelining for Large-Scale Deep Learning on HPC Systems", 2018 IEEE 26th International Symposium on Modeling, analysis, ansd Simulation of Computer and Telecommunication Systems (MASCOTS), IEEE, Sep. 25, 2018, 12 pages.
(Continued)

*Primary Examiner* — Bharat Barot
(74) *Attorney, Agent, or Firm* — Crowell & Moring LLP (57) ABSTRACT

A systems implements a gradient descent calculation, regression calculation, or other machine learning calculation on a dataset (e.g., a global dataset) using a coordination node including coordination circuitry that coordinates multiple worker nodes to create a distributed calculation architecture. In some cases, the worker nodes each hold a portion of the dataset and operate on their respective portion. In some cases, the gradient descent calculation, regression calculation, or other machine learning calculation is used to implement a targeted maximum likelihood scheme for causal inference estimation. The targeted maximum likelihood scheme may be used to conduct causal analysis of the observational data.

18 Claims, 4 Drawing Sheets

(58) Field of Classification Search
USPC .................................................... 706/11–13
See application file for complete search history.

(56) References Cited

U.S. PATENT DOCUMENTS

2016/0308755 A1* 10/2016 Garg ..................... H04L 47/122
2017/0220949 A1* 8/2017 Feng ........................ G06N 20/00
2018/0232661 A1* 8/2018 Li ............................ G06N 5/04
2021/0019284 A1* 1/2021 Bowman ................ G06N 20/00

OTHER PUBLICATIONS

Extended Search Report of European application No. 20181047.0, dated Oct. 19, 2020, 11 pages.
Van der Laan, Mark J. et al., "Targeted Maximum Likelihood Learning," University of California, Berkeley, Division of Biostatistics Working Paper Series, 2006, Paper 213, 90 pages, Berkeley, CA.
Yao, "Targeted Maximum Likelihood (TMLE) for Causal Inference," May 17, 2019, https://towardsdatascience.com/targeted-maximum-likelihood-tmle-for-causal-inference-1be88542a749?gi=2cf41465b16b, visited Jun. 11, 2019.
Communication Pursuant to Article 94(3) EPC, in Europe Application No. 20181047.0, dated Feb. 17, 2022, 9 pages.

* cited by examiner

COORDINATED MULTIPLE WORKER NODE CAUSAL INFERENCE FRAMEWORK

PRIORITY

This is application claims priority to U.S. Provisional Application No. 62/865,022, filed Jun. 21, 2019, titled Coordinated Multiple Worker Node Analysis Platform, which is incorporated by reference in its entirety.

TECHNICAL FIELD

This disclosure relates to coordinating multiple worker nodes for distributed calculation.

BACKGROUND

Rapid advances in electronics and communication technologies, driven by immense customer demand, have resulted in the widespread adoption of distributed computing. As one example, cloud computing operations involve up to exabytes or more of data analysis every year. Improvements in distributed computing execution will continue to increase the features and options available to operators of distributed computing operations.

DETAILED DESCRIPTION

The various systems described below implement a gradient descent calculation, regression calculation, or other machine learning calculation on a dataset (e.g., a global dataset) using a coordination node including coordination circuitry that coordinates multiple worker nodes to create a distributed calculation architecture. In some cases, the worker nodes each hold a portion of the dataset and operate on their respective portion. In some cases, the gradient descent calculation, regression calculation, or other machine learning calculation is used, together with targeted maximum likelihood scheme for causal inference estimation. The targeted maximum likelihood scheme may be used to conduct causal analysis, manage bias or other sampling features of the dataset.

In some cases, data available in one location (e.g., logical location and/or physical location) may not necessarily be available in another location (or any other location). For example, data may be private, sensitive, and/or proprietary. In some cases, data may be impossible, expensive or impractical to transfer (e.g., large datasets (potentially many terabyte in size or larger)). Nevertheless, the data may be analyzed to gain valuable insights. In some cases, those insights may be even more accurate if combined with data available at a second location. In various cases, there may be multiple "partition" datasets where for any given location at least one of the multiple dataset partitions is not available. As an illustrative example, each partition may include unique data such that for any given data entry it may only be accessible via its respective worker node. Non-availability may be more than an instance of non-local storage. Rather, non-availability may include true non-accessibility of the data from the location (whether the access attempt is local or remote). Accordingly, to perform a causal analysis on a global dataset that is a union of these dataset partitions a technical solution to the technical problem of applying computerized causal analysis on data where the authority applying the computerized causal analysis lacks access to various portions of the dataset being analyzed.

In some cases, a coordination node may coordinate multiple worker nodes to perform localized computing on their respective dataset partitions. The coordination node may (in an iterative process) manage model convergence and/or dataset bias through a parameter provision and feedback system as discussed below. However, the coordination node may rely on the worker nodes to perform the portions of the analysis involving dataset interaction. The worker nodes may then feedback the analysis results rather than the underlying data itself. Accordingly, the underlying data need not necessarily be moved or remotely accessed by a singularly controlled computational entity. Rather, the data may remain unmoved while a global dataset analysis is performed.

Figure 1:
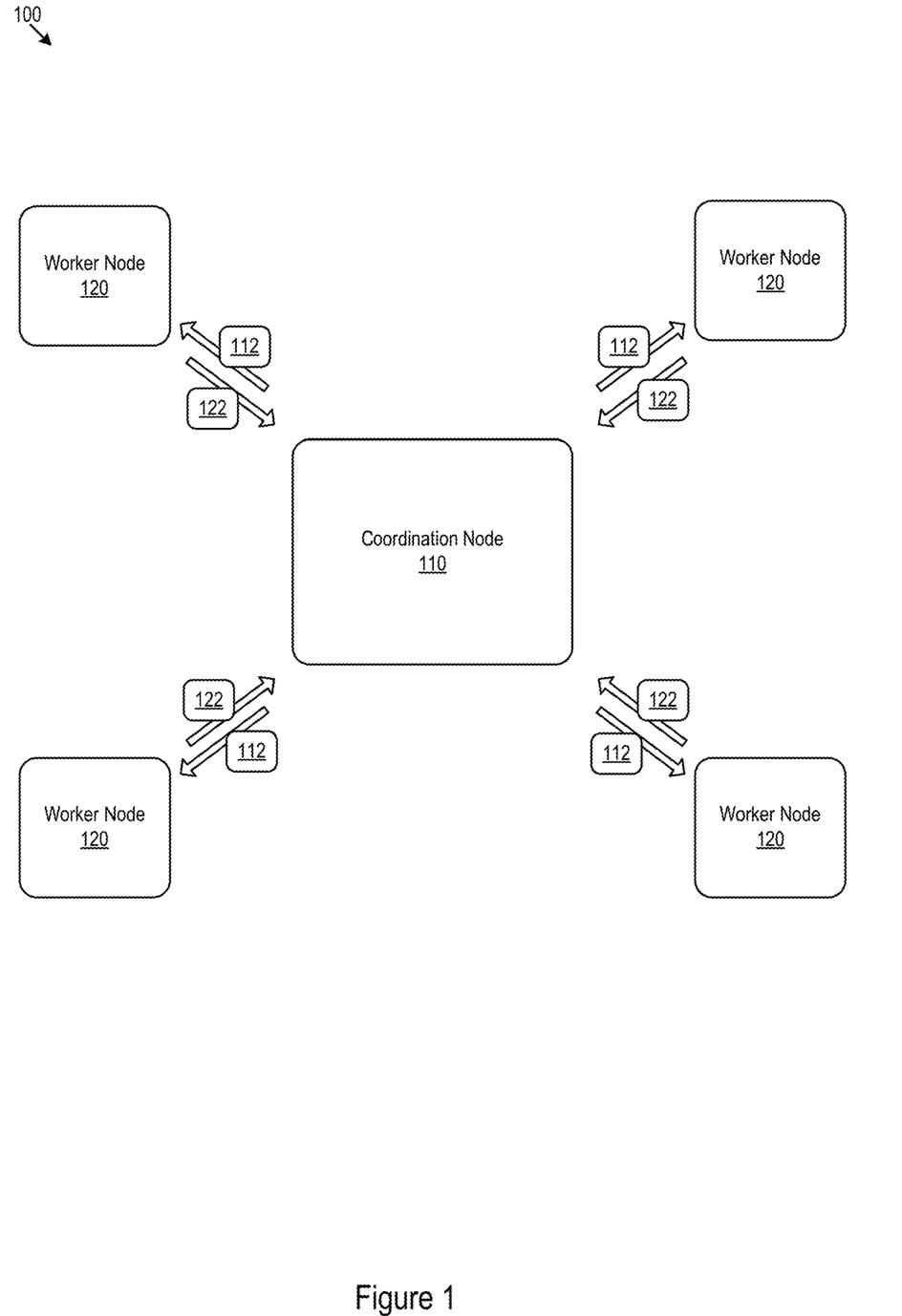
FIG. 1 shows an example coordinated multiple-worker node environment.

FIG. 1 shows an example coordinated multiple-worker node environment (CWE) 100. In the CWE 100, a coordination node 110 may send parameters 112 (e.g., initial parameters, updated parameters, or other parameters) to the worker nodes 120. The worker nodes 120 may perform the analysis and respond with convergence indicators 122.

Figure 2:
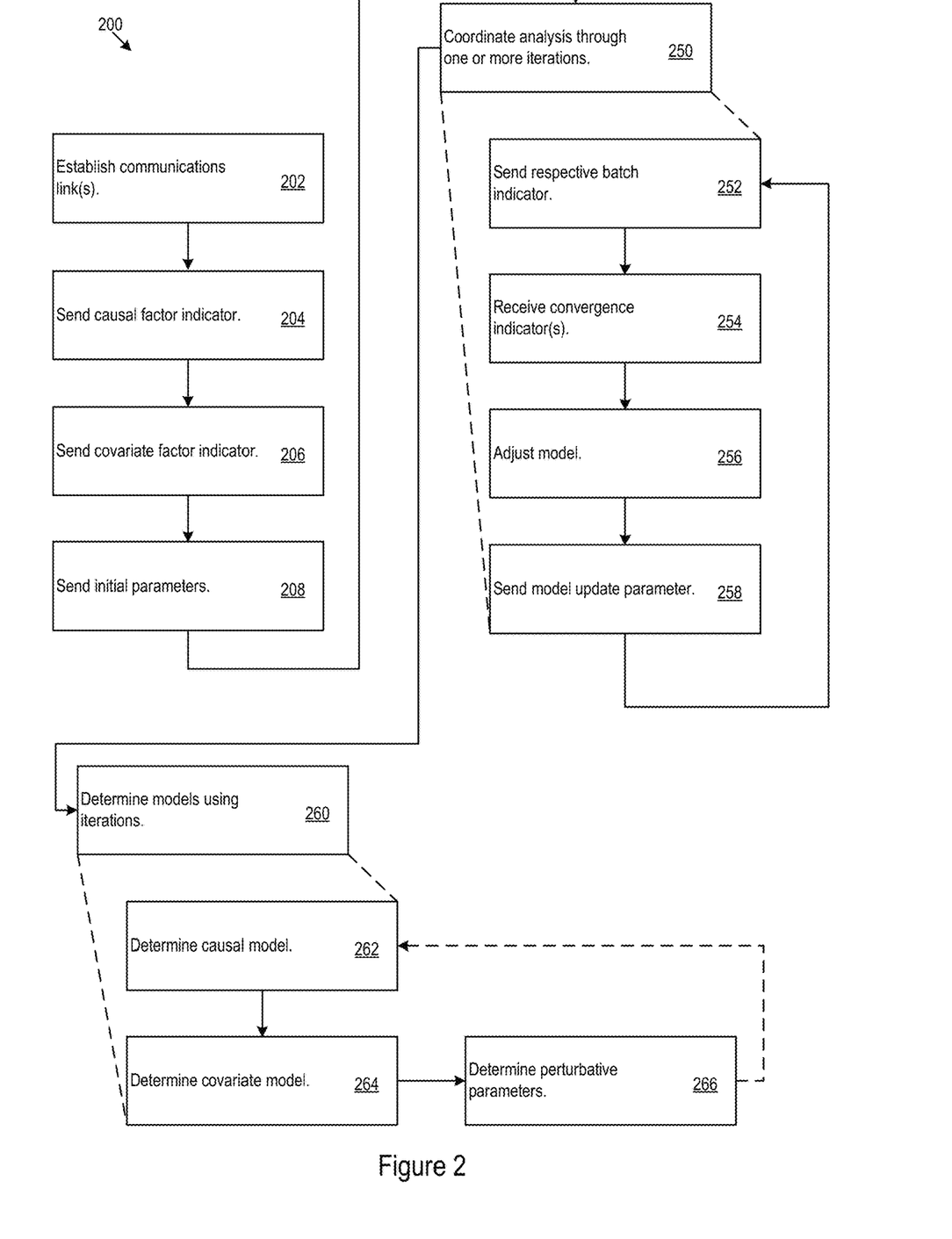
FIG. 2 shows example coordination logic.

Referring now to FIG. 2 while continuing to refer to FIG. 1, FIG. 2 shows example coordination logic (CL) 200, which may be implemented on circuitry. The CL 200 may establish multiple communication links with multiple worker nodes (202). For example, the communication links may be established via communications interface 312, discussed below. The multiple worker nodes may each store a corresponding dataset partition of a global dataset. As discussed above, the entities controlling the multiple worker node may not necessarily allow disclosure, transfer, and/or other logically external or physically remote access of their respective dataset partitions. Accordingly, analysis of the dataset partition may be performed by physically localized and/or logically internal (e.g., within an organization and/or defined access group) computing resources.

The CL 200 may send a causal indicator for a causal factor to each of the multiple worker nodes (204). The causal indicator may facilitate/cause identification of causal-factor-expressed data entries by the multiple worker nodes. For example, the causal indicator may expressly identify a particular dataset (or set of data entries) for which the CL 200 may use to predict an outcome. In other words, the CL 200 may designate a set of potential result entries for which the CL 200 may determine to contribute to an observed outcome. The outcome may have an observable characteristic for which the causal factors are a potential cause.

The CL 200 may send a covariate indicator to each of the multiple worker nodes (206). The covariate indicator may identify covariate-factor-expressed data entries for the causal indicators. In other words, the covariate entries may form the inputs to the model of the causal-factor-expressed entries. The causal-factor-expressed entries may be expressed as a function (or other mathematical transformation) of the covariate-factor-expressed data entries to aid in the reduction/management of bias in the causal factor dataset.

The CL 200 may send initial parameters to the multiple worker nodes (208). The initial parameters may define starting conditions such as an initial seed model, initial model states, and/or initial model parameters. The initial parameters may define rules for data handling, code for execution, or other initial state setup.

The CL 200 may coordinate analysis of the global dataset (e.g., the union of the partition dataset) through one or more iterations (250). The iterations may each analyze the model and track convergence using a batch (e.g., a defined portion) of the global dataset.

The CL 200 may send a respective batch indicator to a respective group of the multiple worker nodes (252). The respective batch indicator may indicate the global dataset entries that may be included with the batch for the current iteration. In some cases, other entries within the global dataset may be ignored or otherwise left unused for the current iteration. In some cases, the CL 200 may generate and/or assign identifiers for each data entry within the global dataset. The identifiers may allow the CL 200 to track which data entries have been included in the analysis. To implement the global identifier assignment, the CL 200 may request an indication of the size of the data set partitions from the multiple worker nodes. Accordingly, the CL 200 may assign global identifiers without necessarily being given details about data entry content. In some cases, the CL 200 may request that the multiple worker nodes track inclusion of data entries from their respective dataset partitions. The CL 200 may request inclusion of a specified number of entries. The CL 200 may allow repetitive inclusion of entries (e.g., repeated inclusion of entries before the entire global dataset is processed). In some cases, the CL 200 may disallow such repetition. For example, the CL 200 may progress deterministically (e.g., in accord with a mathematical function or predetermined scheme). In some cases, the CL 200 may proceed non-deterministically (e.g., pseudo-randomly, randomly, stochastically, or otherwise without predictability) through the dataset (e.g., with or without repetition of entries).

In some cases, the CL 200 may not necessarily include every one of the multiple worker nodes in every iteration. In some cases, one worker node may have no entries included in the batch for the current iteration. In some cases, the worker nodes may have different numbers of entries from their respective dataset partitions included in the batch. In some cases, such differences may be correlated with differences in respective sizes of the dataset partitions. For example, larger dataset partitions may be more likely to be included in batches and more likely to have a larger number of entries selected for a batch. Conversely, smaller dataset partitions may be more likely to be excluded from a given batch and likely to have smaller number of entries selected. In some cases, the batch entries may be selected in terms of the global dataset and independently of the respective worker nodes on which the entries are housed.

In some cases, when managing sample bias a particular dataset may be overrepresented in an analysis relative to its size compared to other dataset partitions. In some cases, the CL 200 may take contextual factors into account when selecting iteration batches.

The worker nodes may analyze their respective dataset entries for the batch and the current model parameters. The worker nodes may then send model convergence indicators to the CL 200.

The CL 200 may receive the corresponding respective model convergence indicators from each worker node of the group with entries included in the batch (254). In some cases, worker nodes with no entries in the batch may forgo sending a convergence indicator for the iteration. In some cases, worker nodes with no entries in the batch may send a dummy convergence indicator or no data indicator in place of a convergence indicator.

After receiving the convergence indicators, the CL 200 may adjust the model based on the level of progress to convergence (256). For example, the CL 200 may implement a gradient descent scheme (e.g., a mini-batch gradient decent scheme for batch-based) analysis. However, various parallelized machine learning computational models, regressions or other machine-based computations may be executed on the multiple worker node platform. Additionally or alternatively, the models may be fit to show a functional relationship, probabilistic relationship, or other mathematical relationship among observed or expressed characteristics of the data entries.

The CL 200 may send a model parameter update in view of the adjustment to the model (258).

Table 1 shows parameters for a gradient descent scheme.

TABLE 1

Gradient Descent Scheme

| | |
|---|---|
| Worker nodes determine gradient descent $\Delta_i$ for a number $m_i$ of dataset entries (x, y) and model function $h_\theta$. | $\Delta_i = \sum_{j=1}^{m_i}(h_\theta(x^{(j)}) - y^{(j)})x^{(j)}$ |
| Aggregate partial gradient values $\Delta$ (e.g. by summing over gradient values (or other convergence indicator) from N worker nodes. | $\Delta_t = \sum_{i=1}^{N}\Delta_i$ |
| Update model parameters $\theta$. | $\theta^{\tau+1} := \theta^\tau - \alpha\sum_{i=1}^{N}\Delta_i$ |
| Check for convergence (e.g. by determining that iterative adjustment to model parameter is smaller than a convergence metric $\epsilon$, and is decreasing). | $|\theta^{\tau+1} - \theta^\tau| \le \epsilon$ |
| Broadcast updated model parameters. | $\theta^{\tau+1}$ |

The CL 200 may determine various models using the iterations (260).

The CL 200 may use the multiple iterations to determine a causal model (e.g., the outcome in terms of the causal-factor-expressed entries) (262), and one or more covariate model (264) (e.g., modeling the causal-factor-expressed entries in terms of the covariate-factor-expressed entries).

After obtaining initial causal and covariate models, the CL 200 may determine perturbative parameters for the causal model (266), where the perturbative parameters are based on an estimate of the causal model expressed in terms of the covariate model(s). The perturbation to the causal model may allow for an assessment of dataset bias. The causal model may be adjusted to account for the bias. In some cases, generation of an estimate of the causal model using the covariate model(s) may be used to implement a targeted maximum likelihood scheme.

Table 2 shows parameters for a targeted maximum likelihood scheme.

TABLE 2

Targeted Maximum Likelihood Scheme

| | |
|---|---|
| Parameters (This example covers binary treatment. However, non-binary (e.g. discrete or continuous variable) treatments may be used.) | Y—outcome<br>A—Treatment<br>(0: no treatment, 1: treatment)<br>W—covariates |
| Fit a machine learning model to | g(Y)~f(W, A) |

TABLE 2-continued

Targeted Maximum Likelihood Scheme

| | |
|---|---|
| estimate Y as a function of (W, A). | $\hat{Y}_0 = g^{-1}(f(W, A = 0))$ $\hat{Y}_1 = g^{-1}(f(W, A = 1))$ |
| Fit to a binary classification model to estimate A as function of covariates W. | A~h(W) In some cases, a logistic regression may be used for the model function h. A~logit($\theta$W) → $\hat{\theta}$ |
| Predict the propensity score, where expit( ) is the inverse of the logit( ) function. | $\hat{\pi}_1 = \text{expit}(\hat{\theta}W)$ $\hat{\pi}_0 = 1 - \hat{\pi}_1$ |
| Estimate "clever" covariates $\hat{H}_0$ and $\hat{H}_1$. | $\hat{H}_0 = \dfrac{1-A}{\hat{\pi}_0}$ $\hat{H}_1 = \dfrac{A}{\hat{\pi}_1}$ |

The targeted maximum likelihood scheme may be implemented by inverting the covariate model to determine covariate coefficients. In some cases, the covariate coefficients may include the "clever" covariates shown in Table 2. In some cases, the covariate model may be include a fit of a logarithmic function, a logit function, and/or a logistic function. Accordingly, inversion of the model may be standardized where a known or consistent model is used.

After the perturbative parameters are obtained, the CL 200 may continue to run iterations to refine the causal and/or covariate models. In some cases, the process may cycle until a convergence metric is met. For example, various models may include defined accuracy metrics that can be assed using convergence indicators. In some cases, the process may terminate after a defined number of convergence/perturbation iterations. Additionally or alternatively, an initial model may be determine and then perturbed and no further cycles may be implemented. In some cases, initial "seed" models may be determined without iterative convergence. These initial models may be perturbed and then used to obtain convergence. In various cases, causal models may be developed using different analysis tracks. For example, covariate models developing using iterative convergence may be used to perturb a seed causal model that is later refined through iterative convergence.

In various implementations, various data structures may be used for the indicators and parameter used by the CL 200 and worker nodes. For example, the causal indicator, covariate indicator, model convergence indicators, model update parameters and batch indicators include a raw data files, comma separated value files, javascript object notation files, yet another markup language files, extensible markup language files, or other data structure or message designed to convey parameters to support calculation. In some cases different ones of the different batch indicators, model update parameters, and/or model convergence indicators use different data structure/message types depending the corresponding worker node to which they are sent or received. For example, different ones of the corresponding worker nodes may support (or not support) different data structure/message types.

Figure 3:
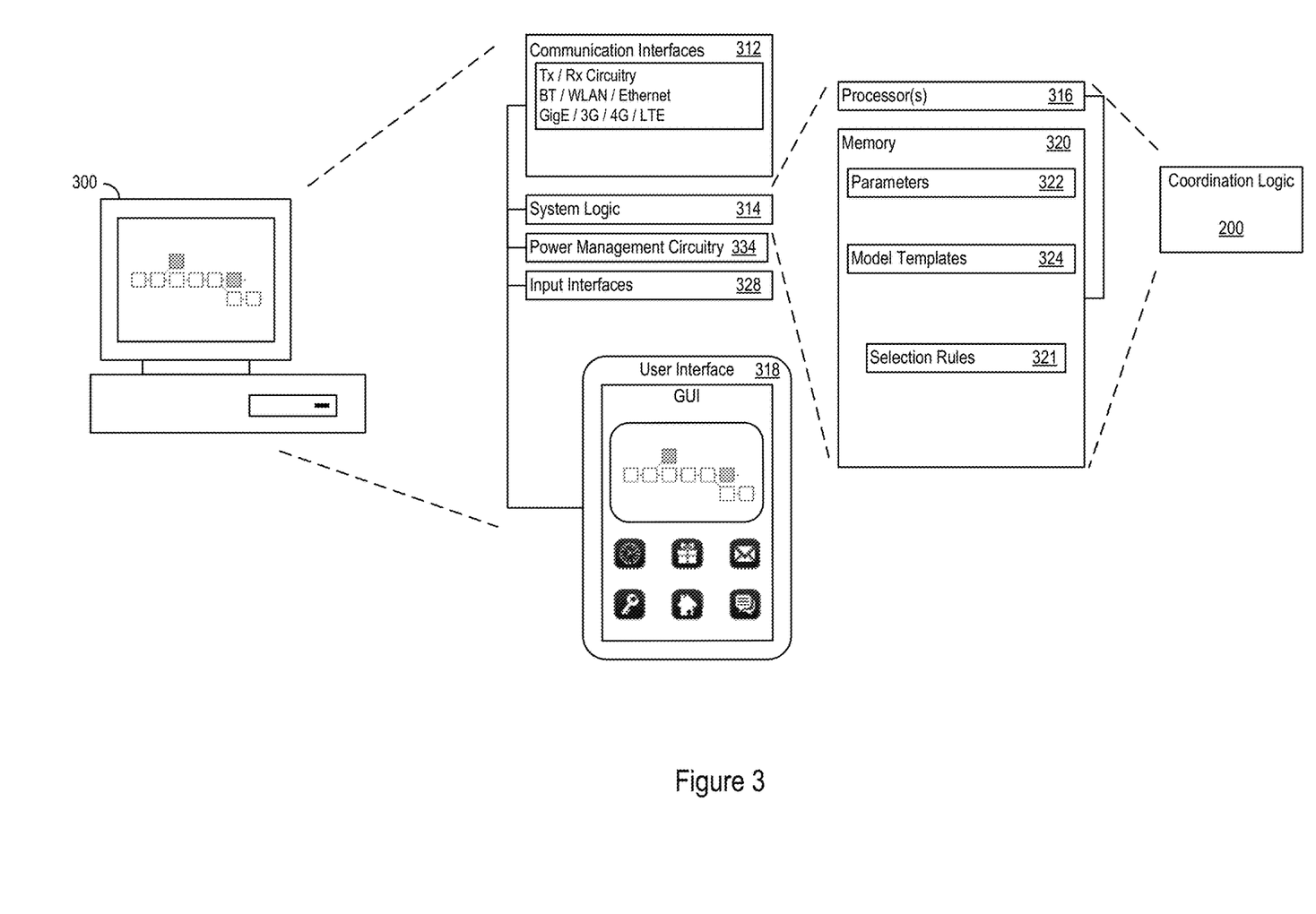
FIG. 3 shows an example coordination execution environment.

FIG. 3 shows an example coordination execution environment (CEE) 300, which may provide an execution environment for implementing coordination of the multiple worker nodes. The CEE 300 may be used by, for example, a coordination node coordinating calculations by the multiple worker nodes. The CEE 300 may include system logic 314 to support tasks described in the drawings and/or claims.

The system logic 314 may include processors 316, memory 320, and/or other circuitry, which may be used to implement CL 200, which may operate to coordinate the multiple worker nodes.

The memory 320 may be used to store parameters 322 and/or model templates 324 used in the coordinated calculations. The memory 320 may further store selection rules 321, that may facilitate designation of covariates, data entries or other selections.

The memory 320 may further include applications and structures, for example, coded objects, templates, or one or more other data structures to support coordinated calculations. The CEE 300 may also include one or more communication interfaces 312, which may support wireless, e.g. Bluetooth, Wi-Fi, WLAN, cellular (3G, 4G, LTE/A), and/or wired, ethernet, Gigabit ethernet, optical networking protocols. The communication interface 312 may support communication, e.g., through the communication layer as network interface circuitry, with worker nodes or other parties to facilitate coordinated calculations. Additionally or alternatively, the communication interface 312 may support secure information exchanges, such as secure socket layer (SSL) or public-key encryption-based protocols for sending and receiving private data. The CEE 300 may include power management circuitry 334 and one or more input interfaces 328.

The CEE 300 may also include a user interface 318 that may include man-machine interfaces and/or graphical user interfaces (GUI). The GUI may be used to present interfaces and or coordinated calculation options to operators working on behalf of the parties.

Figure 4:
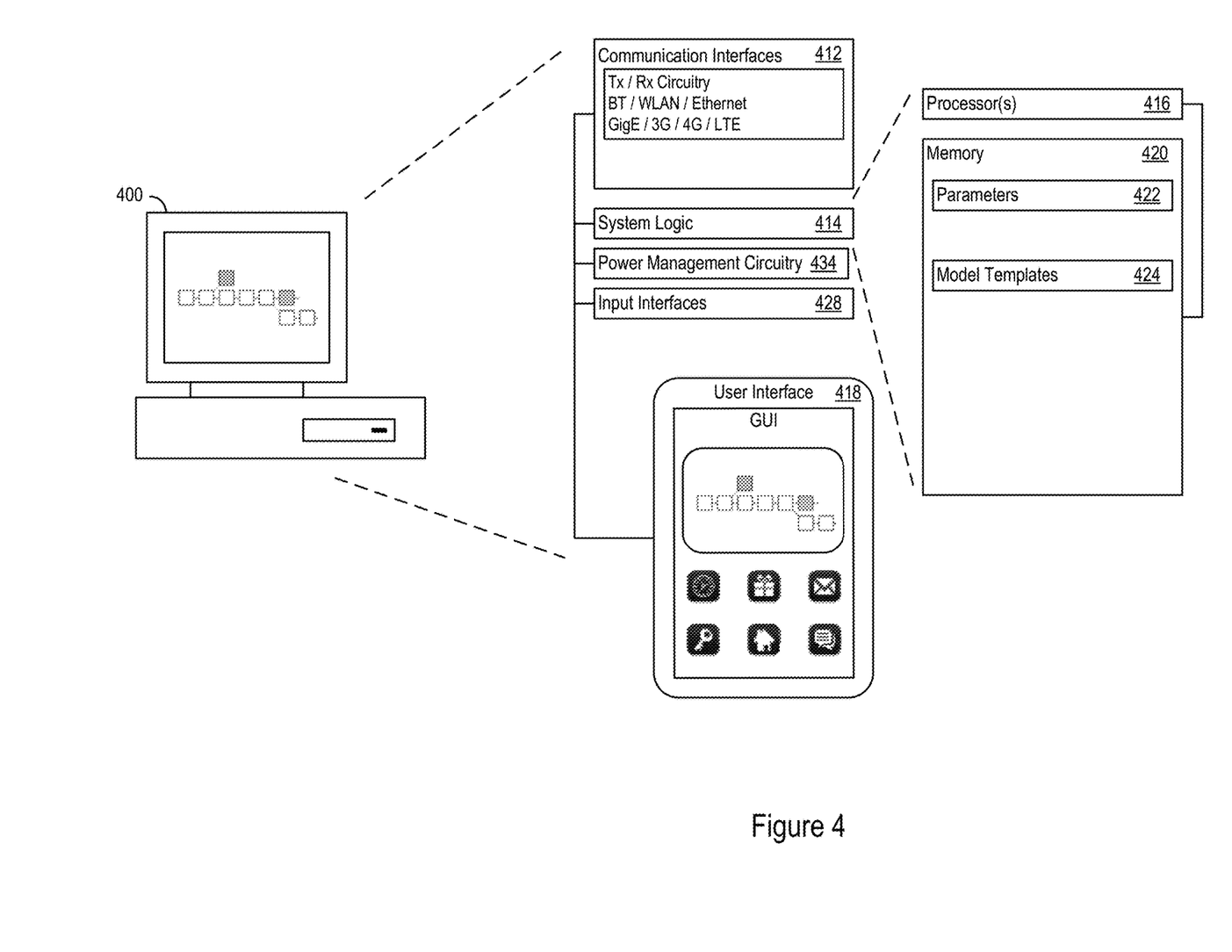
FIG. 4 shows an example worker execution environment.

FIG. 4 shows an example worker execution environment (WEE) 400, which may provide an execution environment for implementing of computation on a worker node. The WEE 400 may be used by, for example, a worker node being coordinated by coordination logic 200. The WEE 400 may include system logic 414 to support tasks including model calculations, such as gradient descent schemes. The system logic 414 may include processors 416, memory 420, and/or other circuitry, which may be used to implement worker node calculations and follow parameter updates from the CL 200.

The memory 420 may be used to store parameters 422 and/or model templates 424 used in the worker node calculations.

The memory 420 may further include applications and structures, for example, coded objects, templates, or one or more other data structures to support worker node calculations. The WEE 400 may also include one or more communication interfaces 412, which may support wireless, e.g. Bluetooth, Wi-Fi, WLAN, cellular (3G, 4G, LTE/A), and/or wired, ethernet, Gigabit ethernet, optical networking protocols. The communication interface 412 may support communication, e.g., through the communication layer as network interface circuitry, with the CL 200. Additionally or alternatively, the communication interface 412 may support secure information exchanges, such as secure socket layer (SSL) or public-key encryption-based protocols for sending and receiving private data. The WEE 400 may include power management circuitry 434 and one or more input interfaces 428.

The WEE 400 may also include a user interface 418 that may include man-machine interfaces and/or graphical user interfaces (GUI). The GUI may be used to present interfaces and or calculation participation options to operators working on behalf of the parties.

The methods, devices, processing, and logic described above may be implemented in many different ways and in many different combinations of hardware and software. For example, all or parts of the implementations may be circuitry that includes an instruction processor, such as a Central Processing Unit (CPU), microcontroller, or a microprocessor; an Application Specific Integrated Circuit (ASIC), Programmable Logic Device (PLD), or Field Programmable Gate Array (FPGA); or circuitry that includes discrete logic or other circuit components, including analog circuit components, digital circuit components or both; or any combination thereof. The circuitry may include discrete interconnected hardware components and/or may be combined on a single integrated circuit die, distributed among multiple integrated circuit dies, or implemented in a Multiple Chip Module (MCM) of multiple integrated circuit dies in a common package, as examples.

The circuitry may further include or access instructions for execution by the circuitry. The instructions may be embodied as a signal and/or data stream and/or may be stored in a tangible storage medium that is other than a transitory signal, such as a flash memory, a Random Access Memory (RAM), a Read Only Memory (ROM), an Erasable Programmable Read Only Memory (EPROM); or on a magnetic or optical disc, such as a Compact Disc Read Only Memory (CDROM), Hard Disk Drive (HDD), or other magnetic or optical disk; or in or on another machine-readable medium. A product, such as a computer program product, may particularly include a storage medium and instructions stored in or on the medium, and the instructions when executed by the circuitry in a device may cause the device to implement any of the processing described above or illustrated in the drawings.

The implementations may be distributed as circuitry, e.g., hardware, and/or a combination of hardware and software among multiple system components, such as among multiple processors and memories, optionally including multiple distributed processing systems. Parameters, databases, and other data structures may be separately stored and managed, may be incorporated into a single memory or database, may be logically and physically organized in many different ways, and may be implemented in many different ways, including as data structures such as linked lists, hash tables, arrays, records, objects, or implicit storage mechanisms. Programs may be parts (e.g., subroutines) of a single program, separate programs, distributed across several memories and processors, or implemented in many different ways, such as in a library, such as a shared library (e.g., a Dynamic Link Library (DLL)). The DLL, for example, may store instructions that perform any of the processing described above or illustrated in the drawings, when executed by the circuitry.

Various implementations have been specifically described. However, many other implementations are also possible.

A1 In an example, a system includes: network interface circuitry configured to: establish multiple communication links with multiple worker nodes, the multiple worker nodes each configured to store a corresponding dataset partition of a global dataset; send a causal indicator for a causal factor to each of the multiple worker nodes, the causal indicator configured to facilitate identification of causal-factor-expressed data entries by the multiple worker nodes; and send a covariate indicator to each of the multiple worker nodes, the covariate indicator identifying covariate-factor-expressed data entries by the multiple worker nodes for each covariate designated in the covariate indicator; for each model iteration: send a respective batch indicator to a respective group of the multiple worker nodes, corresponding dataset partitions of each worker node of the respective group including a portion of a respective batch selected from the global dataset; receive a corresponding respective model convergence indicator from each worker node of the respective group; and send, to each of the multiple worker nodes, a respective model update parameter for the model iteration; and coordination circuitry in data communication with the network interface circuitry, the coordination circuitry configured to: using model iterations, fit a causal model of predicting a relationship between an outcome and the causal factor based on the causal-factor-expressed data entries; using model iterations, fit a covariate model predicting a relationship between the causal factor and the one or more covariates designated in the covariate indicator; and using model iterations, obtain perturbative parameters based on the causal model and the covariate model; for each model iteration: select the respective batch from the global dataset; generate the respective batch indicator based on the respective batch selected from the global dataset; and based on one or more respective model convergence indicators received from the respective group, generate the respective model update parameter.

A2 The system of example A1, where: causal factor includes an observable characteristic with a potential causal relationship for the outcome; and the outcome includes an observable characteristic present for some or all of the causal-factor-expressed data entries.

A3 The system of any of the preceding examples, where the coordination circuitry is configured to obtain perturbative parameters based on the causal model and the covariate model by: causing inversion of the covariate model to determine covariate coefficients; and causing perturbation of the causal model with factors based on the covariate coefficients to determine the perturbative parameters.

A4 In an example, a system includes: network interface circuitry configured to: establish multiple communication links with multiple worker nodes, the multiple worker nodes each configured to store a corresponding dataset partition of a global dataset; for each model iteration: send a respective batch indicator to a respective group of the multiple worker nodes, corresponding dataset partitions of each worker node of the respective group including a portion of a respective batch selected from the global dataset; receive a corresponding respective model convergence indicator from each worker node of the respective group; and send, to each of the multiple worker nodes, a respective model update parameter for the model iteration; and coordination circuitry in data communication with the network interface circuitry, the coordination circuitry configured to: for each model iteration: select the respective batch from the global dataset; generate the respective batch indicator based on the respective batch selected from the global dataset; and based on one or more respective model convergence indicators received from the respective group, generate the respective model update parameter.

A5 The system of any of the preceding examples, where a first corresponding dataset partition of a first of the multiple worker nodes contains first data not present in any of the other corresponding dataset partitions.

A6 The system of example A5 or any of the other preceding examples, where the coordination circuitry lacks access privileges for the first data.

A7 The system of any of the preceding examples, where causal factor includes an observable characteristic with a potential causal relationship for an outcome; and the outcome includes an observable characteristic present for causal-factor-expressed data entries present in the global dataset.

A8 The system of any of the preceding examples, where the model iterations implement a machine learning computation, regression algorithm, or both.

A9 The system of any of the preceding examples, where: the model iterations implement a gradient descent scheme; and the gradient descent scheme is used to determine the model.

A10 The system of example A9 or any of the other preceding examples, where the gradient descent scheme includes a mini-batch gradient descent scheme.

A11 The system of example A10 or any of the other preceding examples, where the respective batch indicator designates specific data entries of the global dataset for inclusion in a respective mini-batch selected independently of which dataset partitions include the specific data entries.

A12 The system of example A11 or any of the other preceding examples, where designation of the specific data entries is performed non-deterministically.

A13 The system of example A12 or any of the other preceding examples, where designation of the specific data entries progresses through the global dataset without repetition of entries.

A14 The system of any of the preceding examples, where the system is configured to implement a targeted maximum likelihood scheme by determining an estimate of a causal model for the global dataset as a function of a covariate model.

A15 The system of example A14 or any of the other preceding examples, where the coordination circuitry is configured to obtain perturbative parameters based on the causal model and the covariate model by: causing inversion of the covariate model to determine covariate coefficients; and causing perturbation of the causal model with factors based on the covariate coefficients to determine the perturbative parameters.

A16 In an example, a method includes: at network interface circuitry: establishing multiple communication links with multiple worker nodes, the multiple worker nodes each configured to store a corresponding dataset partition of a global dataset; for each model iteration: sending a respective batch indicator to a respective group of the multiple worker nodes, corresponding dataset partitions of each worker node of the respective group including a portion of a respective batch selected from the global dataset; receiving a corresponding respective model convergence indicator from each worker node of the respective group; and sending, to each of the multiple worker nodes, a respective model update parameter for the model iteration; and at coordination circuitry in data communication with the network interface circuitry: for each model iteration: selecting the respective batch from the global dataset; generating the respective batch indicator based on the respective batch selected from the global dataset; and based on one or more respective model convergence indicators received from the respective group, generating the respective model update parameter.

A17 The method of claim 16, where: the model iterations implement a gradient descent scheme; and determining the model using the gradient descent scheme.

A18 The method of either of examples 16 or 17, where the gradient descent scheme includes a mini-batch gradient descent scheme.

A19 The method of example 18 or either of examples 16 or 17, where the respective batch indicator designates specific data entries of the global dataset for inclusion in a respective mini-batch selected independently of which dataset partitions include the specific data entries.

A20 The method of example 18 or any of examples 16-18, designating the specific data entries through non-deterministic selection.

B1 In an example, a system includes: network interface circuitry configured to: establish multiple communication links with multiple worker nodes, the multiple worker nodes each configured to store a corresponding dataset partition of a global dataset; send a causal indicator for a causal factor to each of the multiple worker nodes, the causal indicator configured facilitate identification of causal-factor-expressed data entries by the multiple worker nodes; and send a covariate indicator to each of the multiple worker nodes identification of covariate-factor-expressed data entries by the multiple worker nodes for each covariate designated in the covariate indicator; for each model iteration: send a respective batch indicator to a respective group the multiple worker nodes, the corresponding dataset partitions of each worker node of the respective group including a portion of a respective batch selected from the global dataset; receive a corresponding respective model convergence indicator from each worker node of the respective group; and send, to each of the multiple worker nodes, a respective model update parameter for the model iteration; and coordination circuitry configured to: using model iterations, fit a causal model of predicting a relationship between an outcome and the causal factor based on the causal-factor-expressed data entries; using model iterations, fit a covariate model predicting a relationship between the causal factor and the one or more covariates designated in the covariate indicator; and using model iterations, obtain perturbative parameters based on the causal model and the covariate model; for each model iteration: select the respective batch from the global dataset; generate the batch indicator based on the respective batch selected from the global dataset; and based on the one or more respective model convergence indicators received from the respective group, generate the respective model update parameter.

B2 In an example, a system includes: network interface circuitry configured to: establish multiple communication links with multiple worker nodes, the multiple worker nodes each configured to store a corresponding dataset partition of a global dataset; for each model iteration: send a respective batch indicator to a respective group the multiple worker nodes, the corresponding dataset partitions of each worker node of the respective group including a portion of a respective batch selected from the global dataset; receive a corresponding respective model convergence indicator from each worker node of the respective group; and send, to each of the multiple worker nodes, a respective model update parameter for the model iteration; and coordination circuitry configured to: for each model iteration: select the respective batch from the global dataset; generate the batch indicator based on the respective batch selected from the global dataset; and based on the one or more respective model convergence indicators received from the respective group, generate the respective model update parameter.

B3 The system of any of the preceding examples, where each of the multiple worker nodes stores less than the complete global dataset, optionally, the only portion of the global data set each of the multiple worker nodes store is the corresponding dataset partition for that worker node.

B4 The system of any of the preceding examples, where causal factor includes an observable characteristic with a potential causal relationship for the outcome, optionally, the outcome includes an observable characteristic present for some or all of the causal-factor-expressed data entries.

B5 The system of any of the preceding examples, where any or all of the causal indicator, covariate indicator, model convergence indicators, model update parameters and batch indicators include a raw data file, comma separated value file, javascript object notation file, yet another markup language file, extensible markup language file, or other data structure or message designed to convey parameters to support calculation, optionally different ones of the different batch indicators, model update parameters, and/or model convergence indicators use different data structure/message types depending the corresponding worker node to which they are sent or received, optionally different ones of the corresponding worker nodes support or do not support different data structure/message types.

B6 The system of any of the preceding examples, where each of the respective batch indicators designate specific data entries of the global dataset for inclusion in the respective batch selected independently of which of the dataset partitions include the specific data entries, optionally where the designation of the specific data entries is performed randomly, pseudorandomly, otherwise non-deterministically, optionally, where the designation of the specific data entries progesses through the global dataset randomly pseudorandomly, non-deterministically, or deterministically.

B7 The system of any of the preceding examples, where the global data set includes data sets specific each of the worker nodes which corresponding to the dataset partitions, optionally, the entities controlling the worker nodes refuse to share or otherwise deny sharing of the content of the dataset partitions, additionally or alternatively, the dataset partitions are not shared by the worker nodes to reduce network transfers supporting calculations based on the global dataset, additionally or alternatively some or all of the dataset partitions are private or proprietary.

B8 The system of any of the preceding examples, where the model iterations implement a machine learning computation, regression algorithm, or other model fitting scheme.

B9 The system of any of the preceding examples, where the model iterations implement a gradient descent scheme, optionally, the gradient descent scheme is used to determine the causal model, the covariate model, and/or the perturbative parameters.

B10 The system of any of the preceding examples, where the model iterations implement a mini-batch gradient descent scheme.

B11 The system of any of the preceding examples, where the individual worker nodes operation on their own corresponding dataset partitions, optionally, without access to the dataset partitions of the other worker nodes.

B12 The system of any of the preceding examples, where the system is configured to implement a targeted maximum likelihood scheme, optionally, to manage bias within the global dataset.

B13 The system of any of the preceding examples, where the model respective update parameters include various adjustments to a mathematical model being fit to show a functional relationship, probabilistic relationship, or other mathematical relationship among observed or expressed characteristics of the data entries.

B14 The system of any of the preceding examples, where the covariate model includes a fit of a logarithmic function, a logit function, and/or a logistic function.

B15 The system of any of the preceding examples, where the coordination circuitry is configured to obtain perturbative parameters based on the causal model and the covariate model by performing and/or causing some or all of the following: inverting the covariate model to determine covariate coefficients, optionally the covariate coefficients include clever covariates; perturbing the causal model with factors based on the covariate coefficients to determine the perturbative parameters; and/or implementing any or all of the calculations described above or in U.S. Provisional Application No. 62/865,022, which was previously incorporated by reference herein.

B16 The system of any of the preceding examples, where the model iterations implement any or all of the calculations described above or in U.S. Provisional Application No. 62/865,022, which was previously incorporated by reference herein.

B17 In an example, a method is implemented by operating the system of any of the preceding examples.

B18 In an example, a product includes: machine-readable media other than a transitory signal; instructions stored on the machine-readable media, the instructions configured to, when executed, cause a machine to implement the method of example B17.

B19 In an example, a method includes implementing a gradient descent calculation, regression calculation, or other machine learning calculation on a dataset using a coordination node including coordination circuitry that coordinates multiple worker nodes, optionally the worker nodes each hold a portion of the dataset and operate on their respective portion.

B20 The method of example B19, further including using the gradient descent calculation, regression calculation, or other machine learning calculation to implement a targeted maximum likelihood scheme.

B21 In an example, a system is configured to implement any of or any combination of the features described in the preceding examples or disclosure.

B22 In an example, a method includes implementing any of or any combination of the features described in the preceding examples or disclosure.

B23 In an example, a product includes: machine-readable media; instructions stored on the machine-readable media, the instructions configured to cause a machine to implement any of or any combination of the features described in the preceding examples or disclosure.

B24 The product of example B23, where: the machine-readable media is other than a transitory signal; and/or the instructions are executable.

Headings and/or subheadings used herein are intended only to aid the reader with understanding described implementations.

What is claimed is:

1. A system including:
network interface circuitry configured to:
establish multiple communication links between the network interface circuitry with multiple worker nodes, the multiple worker nodes each configured to store a corresponding dataset partition of a global dataset;
send, to each of the multiple worker nodes, a causal indicator for a causal factor, the causal indicator configured to facilitate identification of causal-factor-expressed data entries by the multiple worker nodes; and
send, to each of the multiple worker nodes, a covariate indicator, the covariate indicator identifying covariate-factor-expressed data entries by the multiple worker nodes for each covariate designated in the covariate indicator;

for each iteration:
  send, to a respective group of the multiple worker nodes, a respective batch indicator, corresponding dataset partitions of each worker node of the respective group including a portion of a respective batch selected from the global dataset;
  receive, from each worker node of the respective group, a corresponding respective model convergence indicator; and
  send, to each of the multiple worker nodes, a respective model update parameter for the iteration; and
coordination circuitry in data communication with the network interface circuitry, the coordination circuitry configured to:
  using iterations, fit a causal model of predicting a relationship between an outcome and the causal factor based on the causal-factor-expressed data entries;
  using iterations, fit a covariate model predicting a relationship between the causal factor and the one or more covariates designated in the covariate indicator; and
  using iterations, obtain perturbative parameters based on the causal model and the covariate model by:
    causing inversion of the covariate model to determine covariate coefficients, and
    causing perturbation of the causal model with factors based on the covariate coefficients to determine the perturbative parameters;
  for each iteration:
    select the respective batch from the global dataset;
    generate the respective batch indicator based on the respective batch selected from the global dataset; and
    based on one or more respective model convergence indicators received from the respective group, generate the respective model update parameter.

2. The system of claim 1, where:
causal factor includes an observable characteristic with a potential causal relationship for the outcome; and
the outcome includes an observable characteristic present for some or all of the causal-factor-expressed data entries.

3. A system including:
network interface circuitry configured to:
  establish multiple communication links between the network interface circuitry with multiple worker nodes, the multiple worker nodes each configured to store a corresponding dataset partition of a global dataset;
  for each iteration:
    send, to a respective group of the multiple worker nodes, a respective batch indicator, corresponding dataset partitions of each worker node of the respective group including a portion of a respective batch selected from the global dataset;
    receive, from each worker node of the respective group, a corresponding respective model convergence indicator; and
    send, to each of the multiple worker nodes, a respective model update parameter for the iteration; and
coordination circuitry in data communication with the network interface circuitry, the coordination circuitry configured to:
  obtain perturbative parameters based on a causal model and a covariate model by:
    causing inversion of the covariate model to determine covariate coefficients, and
    causing perturbation of the causal model with factors based on the covariate coefficients to determine the perturbative parameters;
  for each iteration:
    select the respective batch from the global dataset;
    generate the respective batch indicator based on the respective batch selected from the global dataset; and
    based on one or more respective model convergence indicators received from the respective group, generate the respective model update parameter.

4. The system of claim 3, where a first corresponding dataset partition of a first of the multiple worker nodes contains first data not present in any of the other corresponding dataset partitions.

5. The system of claim 4, where the coordination circuitry lacks access privileges for the first data.

6. The system of claim 3, where causal factor includes an observable characteristic with a potential causal relationship for an outcome; and
the outcome includes an observable characteristic present for causal-factor-expressed data entries present in the global dataset.

7. The system of claim 3, where the iterations implement a machine learning computation, regression algorithm, or both.

8. The system of claim 3, where:
the iterations implement a gradient descent scheme.

9. The system of claim 8, where the gradient descent scheme includes a mini-batch gradient descent scheme.

10. The system of claim 9, where the respective batch indicator designates specific data entries of the global dataset for inclusion in a respective mini-batch selected independently of which dataset partitions include the specific data entries.

11. The system of claim 10, where designation of the specific data entries is performed non-deterministically.

12. The system of claim 11, where designation of the specific data entries progresses through the global dataset without repetition of entries.

13. The system of claim 3, where the coordination circuitry is configured to implement a targeted maximum likelihood scheme by determining an estimate of the causal model for the global dataset as a function of the covariate model.

14. A method including:
at network interface circuitry:
  establishing multiple communication links between the network interface circuitry with multiple worker nodes, the multiple worker nodes each configured to store a corresponding dataset partition of a global dataset;
  for each iteration:
    sending, to a respective group of the multiple worker nodes, a respective batch indicator, corresponding dataset partitions of each worker node of the respective group including a portion of a respective batch selected from the global dataset;
    receiving, from each worker node of the respective group, a corresponding respective model convergence indicator; and
    sending, to each of the multiple worker nodes, a respective model update parameter for the iteration; and at coordination circuitry in data communication with the network interface circuitry:
obtaining perturbative parameters based on a causal model and a covariate model by:
causing inversion of the covariate model to determine covariate coefficients, and
causing perturbation of the causal model with factors based on the covariate coefficients to determine the perturbative parameters;
for each iteration:
selecting the respective batch from the global dataset;
generating the respective batch indicator based on the respective batch selected from the global dataset; and
based on one or more respective model convergence indicators received from the respective group, generating the respective model update parameter.

15. The method of claim 14, where:
the iterations implement a gradient descent scheme.

16. The method of claim 15, where the gradient descent scheme includes a mini-batch gradient descent scheme.

17. The method of claim 16, where the respective batch indicator designates specific data entries of the global dataset for inclusion in a respective mini-batch selected independently of which dataset partitions include the specific data entries.

18. The method of claim 17, designating the specific data entries through non-deterministic selection.

* * * * *